Oct. 6, 1959  C. S. WHITE  2,907,612
BARRIER AND BONDING MATERIAL FOR LOW FRICTION SURFACE
Filed May 9, 1956  2 Sheets—Sheet 1

INVENTOR.
Charles S. White.
BY
Harness, Dickey & Pierce.
ATTORNEYS.

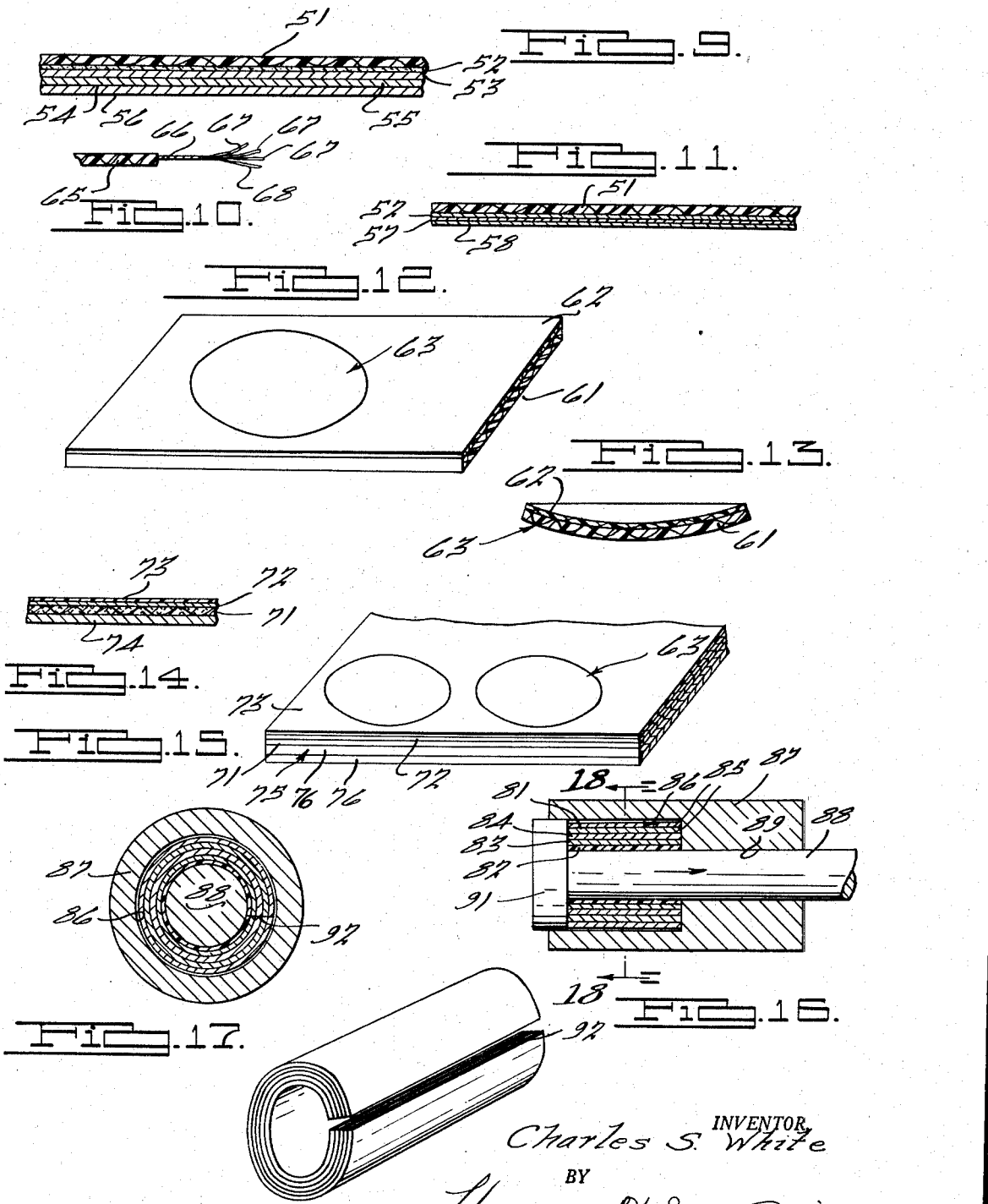

United States Patent Office 2,907,612
Patented Oct. 6, 1959

2,907,612

BARRIER AND BONDING MATERIAL FOR LOW FRICTION SURFACE

Charles S. White, Birmingham, Mich.

Application May 9, 1956, Serial No. 583,656

13 Claims. (Cl. 308—238)

This invention pertains to low friction bearing material, and particularly to a low friction bearing material having barrier material on the back side thereof.

In the copending application of C. S. White, Serial No. 544,945, filed November 4, 1955, now Patent No. 2,804,886, for Low Friction Fabric Material, C. S. White application, Serial No. 544,944, filed November 4, 1955, for Seals and Bearing Device Having Low Friction Sealing Faces, and C. S. White application, Serial No. 583,657, filed May 9, 1956, for A Metal Bearing Having a Low Friction Resin Surface, bearing seals and the like are illustrated having a dry surface of low friction resin material. When the low friction fluoro-carbon resins, such as Teflon, are drawn into threads and woven into a cloth, the interstices between the threads permit the backing materials to pass or bleed during construction or operation. In certain types of rubber seals, especially when molding under pressure, the rubber will flow into and through the interstices of the weave and will be exposed on the front face of the low friction cloth material.

It is an object of the present invention to provide a barrier layer on the rear face of the cloth or film of Teflon or other low friction resin material to prevent any of the materials of the backing member from passing therethrough. When the cloth has bonding cords provided therein, a layer of latex may be bonded thereto which, when cured, forms a barrier material. Any well known bondable resin or other material may be employed as a barrier material if it is capable of preventing the passage of the material of the backing element and has affinity to bond therewith. When the low friction fibrous material of fluorocarbon threads is to have a barrier coating thereon and no bondable threads are secured thereto, then a barrier coating of a fluorocarbon resin is employed having a modified chain which will bond to the threads of the low friction cloth material. In view of the fact that such barrier material must be heated to a high temperature of around 450° F., the material is preferably applied to a cloth woven of glass fibers which withstands the heat and which is thereby bonded to the Teflon or other fluorocarbon material. However, high heat must also be employed to bond the coated cloth of glass fibers to the backing member, and for this reason it may be desired to apply the barrier coating on one side only of the glass fiber cloth so that the remainder of the cloth of glass fibers may be saturated with a low temperature resin which will bond to the rubber, plastic, metal, or other material of the backing member. When applying the coating of barrier material to one side of the glass fiber material, a layer of the fluorocarbon material may be directly bonded to the barrier material, thereby eliminating the necessity of weaving the cloth to provide a low friction surface. Such layer will withstand cold flow because of the intimate bond at all points of the barrier material to a thin layer of the fluorocarbon resin. The barrier coating may be otherwise provided, as for example, a webbing of nylon or other thermoplastic resin may have one face thereof woven with the fibers of the low friction fluorocarbon resin material, such as Teflon. When this is assembled through the application of heat and pressure, the woven threads of the nylon or other thermoplastic material will mat and close the interstices thereof so that none of the material will pass through the weave thereof or through the interstices of the woven Teflon fibers. Such webbing woven from the resin material and the facing of the woven Teflon threads may be cut up into sections to form sleeves for cylindrical inserts for balls or rods against which the low friction material is forced under pressure when the woven belting material is compressed and retained in position with a predetermined pressure. If heat is present, the woven resin threads are compacted and form a seal on the rear face of the low friction material.

It is within the purview of the invention to apply a coating of rubber, latex and the like to the bondable cords in the rear face of the low friction woven material which has affinity to bond with the rubber of the seals or backing element, which, after being cured, will prevent the passage of the material of the backing element through the woven low friction material to the inner face thereof.

Accordingly, the main objects of the invention are: to provide a barrier coat at the rear face of low friction material to prevent the backing material from passing therethrough; to provide a layer of barrier material between a low friction surface and a supporting backing material which bonds the layers together and prevents the passage of the material beneath the bonding layer into the low friction layer; to apply a layer of bondable material on one surface of a layer material which is bonded to the rear face of a low friction material, the other surface of the layer material being impregnated with a bonding material which will bond to a backing member; to provide a belting made up of woven thermoplastic resin threads having on at least one face thereof a low friction woven material through which material is prevented from passing when the thermoplastic threads are heated and compacted into a substantially unitary mass, and, in general, to provide a bonding and barrier material between a low friction resin material and a backing layer which prevents the passage of material through the low friction material and bonds the material to the backing layer.

Other objects and features of novelty of the invention will be specifically pointed out or will become apparent when referring, for a better understanding of the invention, to the following description taken in conjunction with the accompanying drawings, wherein:

Fig. 9 is a sectional view of a sheet, similar to that illustrated in Fig. 1, showing another form thereof;

Fig. 10 is an exploded view of a low friction layer showing a thread thereof;

Fig. 11 is a view of structure, similar to that illustrated in Fig. 9, showing another form thereof;

Fig. 12 is a perspective view of a woven belt material having a layer of woven low friction material thereon;

Fig. 13 is a view in elevation of a washer which is cut from the belt material of Fig. 12;

Fig. 14 is a view of structure, similar to that illustrated in Fig. 9, showing another form of the invention;

Fig. 15 is a view of structure, similar to that illustrated in Fig. 12, showing still another form of the invention;

Fig. 16 is a sectional view of a die and plunger, with material therein which forms a sleeve bearing when heated and compressed;

Fig. 17 is a sectional view of the structure illustrated in Fig. 16, taken on the line 17—17 thereof, and Fig. 18 is a view of structure, similar to that illustrated in Fig. 15, rolled into the shape of a cylindrical blank.

In the above mentioned application, Serial No. 544,944, seals are illustrated having a low friction resin material applied to the shaft engaging faces thereof. The low friction material employed therein was of the woven type having fine interstices between the Teflon threads of the cloth material. Under certain types of application and under certain manufacturing conditions, the resilient material of the backing member bled through the small interstices, and in such instances substantially increased the friction between the low friction material and the polished surface of the shaft. To prevent this under all conditions, a barrier layer is provided on the rear face of the low friction woven material to close the interstices and eliminate any possibility of the backing material bleeding therethrough to the engaging low friction face thereof.

Figure 1:
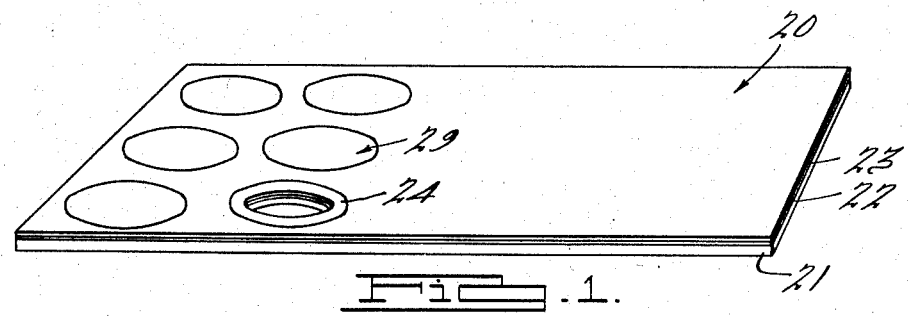
Figure 1 is a plan view of a sheet of material made in accordance with the present invention.

In Figs. 1 to 8, resilient backing members are illustrated with the low friction material secured thereto in a manner to prevent the passage of the material of the backing member through to the engaging face of the low friction material. In Fig. 1 a sheet 20 is illustrated having a backing material 21 of rubber, butyl, or other synthetic resilient material well known in the art, having a barrier and bonding layer 22 which secures the low friction layer 23 to the backing material 21 in a manner to provide an impervious surface which prevents the material of the backing layer from passing therethrough.

Figure 2:
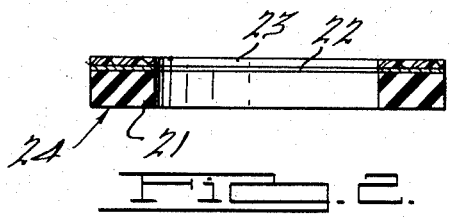
Fig. 2 is a sectional view of a washer cut from the material of Fig. 1.

A washer 24 having a low friction face as illustrated in Fig. 2, is stamped from the sheet 20 of Fig. 1 and clearly discloses the backing member 21 as being made of a resilient material. The bonding and barrier layer 22 secures the surface layer 23 to the backing member 21. The surface layer 23 is a low friction fluorocarbon resin, preferably polytetrafluoroethylene commonly sold under the well known name Teflon, which is woven into a cloth in a manner illustrated, described and claimed in the above mentioned copending application, Serial No. 544,945. In this arrangement, the cloth woven from threads of low friction resin material have bondable cords woven on the under side thereof which readily bond with the barrier material. Such barrier material may be a film of latex which has affinity to bond with the cords and the rubber or like material forming the backing member 21. The latex is first applied and cured and then bonded to the material of the backing member 21. When the layer of latex is cured after bonding to the cords, an impervious layer is provided which prevents the material of the body member 21 from passing therethrough to the low friction layer.

Figure 3:
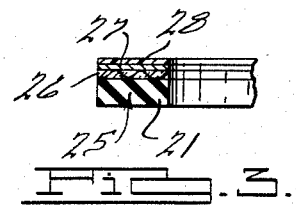
Fig. 3 is a broken view of structure, similar to that illustrated in Fig. 2, showing a further form thereof.

In Fig. 3 a further form 25 of the invention is illustrated, that wherein a cloth material 26 is preferably woven from glass threads to withstand high temperatures. A bonding material, which may be applied to the cloth 26, forms a barrier layer 27 to which the low friction fluorocarbon material 28, such as Teflon, may be directly bonded, eliminating the necessity of weaving a cloth from threads thereof. The glass cloth material having the barrier coat and low friction layer thereon may be then bonded to the backing element 21. As a result, a film of low friction resin material is applied to a glass cloth which is bonded to the backing member 21. Bleeding of the backing material through to the outer face of the low friction fluorocarbon surface is prevented by the bonding material and also the layer of fluorocarbon material, both of which form barrier layers.

Figure 4:
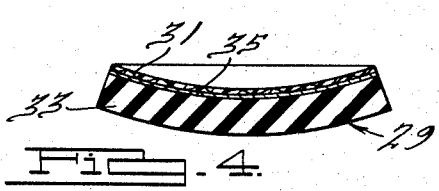
Fig. 4 is a view of a disk which may be cut from the sheet of material illustrated in Fig. 1.
Figure 5:
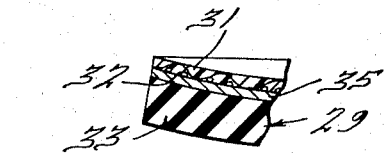
Fig. 5 is a broken sectional view of structure, similar to that illustrated in Fig. 4, showing another form thereof.

In Figs. 4 and 5, a washer is illustrated as having been punched from the sheet 20 with substantial central pressure to produce an arched disk 29 which may be employed in contact with a spherical surface of a ball or other element. A layer of fluorocarbon cloth 31, having bondable cords 32, therein, is secured to the backing member 33, which may be rubber or which may be of resinous sheet or mascerated material, by a bonding layer 35 which anchors the cloth material 31 to the backing member. The bonding layer 35, which may be latex, resin or the like, upon being cured produces a barrier coat which prevents any of the material of the backing member 33, whether rubber, resin or the like, from passing beyond the layer 35 into the woven material 31.

Figure 6:
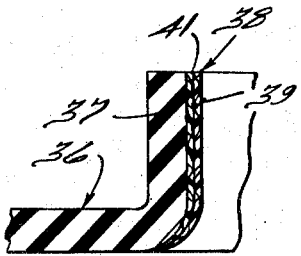
Fig. 6 is a broken sectional view of a seal having a low friction engaging surface, embodying features of the present invention.

In Fig. 6 a seal 36 is illustrated, having a cylindrical portion 37, the inner surface of which is to engage a rod movable therein. A sleeve 38 is placed on the inner surface of the cylindrical portion 37, having an outer layer 39 of woven low friction fluorocarbon resin material to which an outer layer 41 of a thermoplastic resin material, such as nylon, is woven. When the thermoplastic resin material is bonded to the inner face of the cylindrical member 37, substantial pressure is employed between the inner face of the low friction resin material 39 and the outer surface of the cylindrical portion 37. In the presence of heat, the nylon or similar resin threads become pliable and mat together to form a barrier for the material of the seal, preventing it from passing therethrough to the low friction resin material 39.

Figure 7:
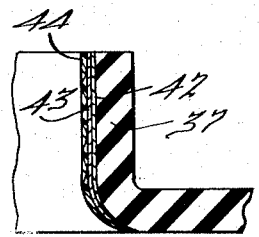
Fig. 7 is a view of structure, similar to that illustrated in Fig. 6, showing another form of the invention.

A similar construction is illustrated in Fig. 7, wherein a primer coat 42 is first applied to the inner surface of the cylindrical portion 37 of the seal and cured, after which a layer 43 of barrier material is bonded to the primer coat. The layer 43 is preferably a fluorocarbon derivative which will bond to the primer coat as well as to other fluorocarbons having low friction characteristics which form a layer 44 thereon. This layer may be an outer coating cured to the barrier coating or may be a woven layer of the fluorocarbon thread, such as the Teflon threads. Whether a cured layer or the woven layer is employed, in either case the material 43 will form a barrier, preventing the passage of the seal material to the low friction resin layer.

Figure 8:
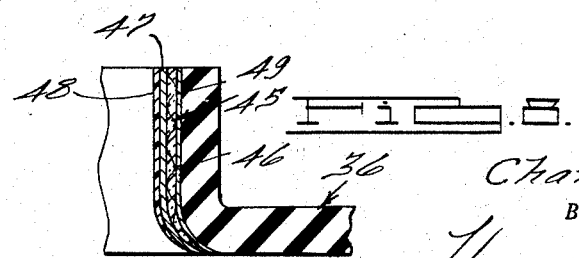
Fig. 8 is a broken view of structure, similar to that illustrated in Fig. 7, showing a further form thereof.

In Fig. 8 another form of the seal 36 is illustrated, that wherein a sleeve 45 is built up from a cloth 46 of glass fibers to which the fluorocarbon derivative 47 is applied to form the barrier layer and also a bond with the low friction unwoven layer 48 which is preferably of the fluorocarbon series, such as Teflon. The glass cloth 46 may have the barrier and bonding material 47 applied on the one side only thereof, permitting the opposite side to be coated with a lower temperature bonding material 49 which may be latex, resin or the like, which will bond to the resilient material forming the body of the seal 36.

In Fig. 9 a further form of the invention is illustrated, that wherein a woven cloth 51 of low friction fluorocarbon resin, such a Teflon, has a coating of fluorocarbon derivative 52 which will bond thereto and which may be bonded to a layer 53 forming a portion of the backing material 54. This layer 53 may be glass fiber cloth to which the bonding material 52 will adhere and which is cured under a high temperature. The opposite side of the cloth 53 may then be saturated with any other resin, phenol, vinyl and like types, which will bond to the similar resin of the layers 55 and 56 which form the backing material 54 for the low friction layer 51.

In Fig. 11 the woven low friction fluorocarbon material 51, such as Teflon, has a barrier layer 52 bonded thereto and to a layer 57 of a fluorocarbon resin with an affinity to bond to the resin of the backing material 58, which may be phenol, vinyl, or the like. In this arrangement, the low friction material 51 has the barrier layer 52 on the rear face which prevents the resin material 57 and 58 from passing into engagement with the low friction material 51.

In Fig. 12 a further form of the invention is illustrated, that wherein a strip of belting 61 is woven from a thermoplastic resin thread, such as nylon, vinyl and the like and which has woven on one surface thereof a layer of low friction fluorocarbon resin material 62, such as Teflon. Disks 63 are stamped from the belting 61, as illustrated in Fig. 13, having substantial pressure applied to the center of the punching device so as to produce a disk shape thereto so that the blank may be formed to the surface of a ball. When so forming the disk, heat is employed which renders the threads of the belting material 61 plastic so that they will be compressed and matted to form a sealed surface which will not pass or permit other material to pass through the interstices of the woven low friction material 62.

While in the application above mentioned, Serial No. 544,945, the woven fiber material has bondable cords on one face thereof, in Fig. 10 the woven low friction material 65 is illustrated as being made of threads 66 which are obtained from fibers 67 of the low friction fluorocarbon resin material, such as Teflon, along with fibers 68 of bondable material, such as cotton, nylon, vinyl and like resins, wool, glass and the like. Each of the threads 66 will have a greater proportion of the low friction material therein and still have exposed fibers of a material which will readily bond to other resins. The cloth 65, when woven from the thread 66, will have a face preponderantly of low friction resin material but will have fibers exposed to which the resins will bond so that the resulting cloth 65 may be directly bonded to backing materials of phenol, vinyl or other resins.

In Fig. 14 a further form of the invention is illustrated, that wherein a cloth 71 of woven glass fibers has the surface thereof coated with a barrier and bonding material 72 to which a layer of low friction fluorocarbon resin material, such as Teflon, is directly bonded. While such low friction resin material is usually subject to cold flow, the thin layer thereof, bonded on all points to the barrier material 72 and to the top surface of the glass fiber cloth 71, eliminates such cold flow. The lower portion of the glass cloth 71 may then be saturated with a low temperature resin, such as phenol, vinyl and the like, which directly bonds to a backing member 74 which may contain the same resin material. This material is preferably built up into a sheet 75, as illustrated in Fig. 15, embodying the barrier and bonding layer 72 supporting the low friction top layer 73 on the top surface of the glass cloth 71 and which is then bonded to the two backing layers 76 which provide a support for the low friction layer 73. From such a sheet, disks 63 may be cut and formed into disk shape, as illustrated in Fig. 13, to be shaped over a ball after heat and pressure are applied thereto, with the low friction surface in accurate mating relationship to the surface of the ball.

In Figs. 16, 17 and 18 a sleeve bearing 81 is illustrated, having an internal layer 82 of the low friction resin material secured to a barrier and bonding layer 83, or which may be a woven cloth of threads of the fluorocarbon resin, such as Teflon, which has the barrier layer 83 secured thereto and to a woven cloth of glass fiber material 84 on the adjacent face, the rear face of which may be saturated with the phenol, vinyl or other resin which bonds to the two backing layers 85 of similar resin material. Preferably the sleeve is made from flat stock and rolled into a cylinder, as illustrated in Fig. 18, and placed in a cylindrical cavity 86 of a die 87. A mandrel 88 is placed through the central opening in engagement with the low friction surface 82 and guided in an aperture 89 in the lower portion of the die 87. The mandrel 88 has a head 91 thereon which fits within the cavity 86 and the assembly is heated and subjected to substantial pressure. The head is forced into the cavity, compacting the material into exact size while the resin closes the gap at the abutting edges 92. The resulting unit is of exact dimensions, having an outer and inner diameter which conform to that of the cavity and mandrel. Thus, any of the sheet material herein illustrated may be employed within the cavity 86 about the mandrel 88, to be compressed when softened under heat to form the sleeve type of bearing. The entire assembly may be heated or the die and mandrel may be heated to a higher temperature than that required to render the material of the layers of the sleeve pliable so that the material may be formed within the cavity about the material.

The primer, barrier and the low friction surface materials may be similar to those procurable in the art from The Fluor-O-Alloy Corporation of Dayton, Ohio and completely described in Patent No. 2,777,783 to Pierre R. Welch. The primer coat, known to the trade as #4020, contains a fluorocarbon monomeric or partially polymerized fluorocarbon resin and at least one conventional hydrocarbon base resin which does not contain a halogen substituent in unpolymerized or partially unpolymerized form, such as vinyl resins, phenol resins, aldehyde resins, acrylic resins and the like. The barrier and bonding material, known to the trade as #4030, has the same or similar conventional hydrocarbon base resin but a greater amount of the fluorocarbon resin of the monomeric or partially polymerized type which therefore has a greater affinity for the pure fluorocarbon resins with which a strong bond is obtained. The low friction surface material is a fluorocarbon resin, such as Teflon, Kel-F, Fluorothene, and the like. The coats are separately cured at a temperature of over 400° F., partially or complete, and the final curing of longer duration may be employed after all of the layers are bonded to each other. A bond is obtained directly between the material known as #4020 to the pure fluorocarbon resins, but this would not be as strong a bond as if a bond were obtained between the barrier and bonding material known as #4030. It is desirable, therefore, under certain conditions, to bond the #4020 coat to the backing element, bond the #4030 coat to the #4020 coat which has strong bonding affinity, and then bond the fluorocarbon resin to the #4030 coat which has a similar strong bond therebetween. Since the #4030 material will bond directly to the glass cloth and like materials, the #4030 material may be employed directly to bond the fluorocarbon resin to a surface thereof. Other primer, barrier and low friction materials known in the art to be suitable may be employed. The ones specifically referred to above, however, have proved satisfactory. It is to be understood that when the term "fluorocarbon resin" is recited herein and in the claims, it is intended to include all of the polymerized materials which are obtained by the polymerization of fluorocarbons including perfluorocarbons and partially substituted fluorocarbons, e.g., the chloro, bromo or nitro-substituted fluorocarbons.

The subject matter herein not claimed, particularly the portions of the present application relating to the thread illustrated in Fig. 10 and the fabric made from such a thread, has been made the subject matter of a divisional application.

What is claimed is:

1. A low friction element including, in combination, a backing member, a barrier material, and a woven cloth of low friction material, the low friction material being secured to the barrier material and backing member, the barrier material forming an impervious layer to prevent the penetration of the backing member through the interstices of the woven cloth to the exposed face thereof.

2. An element having a low friction bearing face including, in combination, a layer of cloth of woven glass threads, a layer of barrier material of the fluorocarbon resin secured on one face of the cloth, a layer of low friction resin material securely bonded to said barrier material, a backing member, and a resin material having affinity to bond with the backing member and to the opposite face of said cloth.

3. A bearing material comprising a woven cloth of fluorocarbon threads having on one face thereof cords which readily bond, a layer of latex applied to the bonding cords to form a barrier layer when cured, and a resilient body to which the latex layer is secured.

4. A bearing element embodying a layer of low friction fluorocarbon resin, a bonding and barrier layer of fluorocarbon resin containing a nonpolyhalocarbon, and a woven cloth of glass fibers to one face of which the layer of barrier and bonding material is secured for securing the low friction layer thereto.

5. A bearing element embodying a layer of low friction fluorocarbon resin, a bonding and barrier layer of fluorocarbon resin containing a nonpolyhalocarbon, a woven cloth of glass fibers to one face of which the layer of barrier and bonding material is secured for securing the low friction layer thereto, a resilient backing member, and means for securing the other side of the glass cloth to the surface of the resilient backing member.

6. A bearing element embodying a layer of low friction fluorocarbon resin, a bonding and barrier layer of fluorocarbon resin containing a nonpolyhalocarbon, a woven cloth of glass fibers to one face of which the layer of barrier and bonding material is secured for securing the low friction layer thereto, a backing member, said backing member including at least one layer of resin material, and a resin having affinity for the resin material of the layer applied to the other side of the glass cloth for securing the cloth to said layer.

7. A bearing element embodying a layer of low friction fluorocarbon resin, a bonding and barrier layer of fluorocarbon resin containing a nonpolyhalocarbon, a woven cloth of glass fibers to one face of which the layer of barrier and bonding material is secured for securing the low friction layer thereto, a backing member, said backing member including at least one layer of resin material, and a resin having affinity for the resin material of the layer applied to the other side of the glass cloth for securing the cloth to said layer, a section of said element being rolled into cylindrical form and treated under heat and pressure to form a sleeve of desired internal and external diameter with a face containing the low friction resin.

8. A member having a low friction bearing surface including, in combination, a backing member of rubber, a layer of woven low friction resin material having means thereon to which a material will bond which is not bondable to the resin material, and a layer of latex bonded to said means and cured to form a barrier layer, the latex being secured to the rubber of said backing member for retaining the woven material in position thereon.

9. A bearing element including a woven layer of thermoplastic resin material having woven on at least one face a weave of low friction fluorocarbon resin, the interstices of the weave being sealed by the threads of the thermoplastic material when heat and pressure are applied thereto to compact and mat the thermoplastic threads.

10. A bearing element including a woven layer of thermoplastic resin material having woven on at least one face a weave of low friction fluorocarbon resin, the interstices of the weave being sealed by the threads of the thermoplastic material when heat and pressure are applied thereto to compact and mat the thermoplastic threads, and a resilient backing member secured to said woven compacted thermoplastic threads.

11. A low friction element including, in combination, a backing member, a barrier material, and a woven cloth of low friction material having means thereon to which a material will bond which is not bondable to the low friction material, said means being secured to the barrier material and said barrier material being secured to the backing member.

12. The invention as defined in claim 1 wherein said woven cloth includes fibers made from a fluorocarbon resin material.

13. The invention as defined in claim 1 wherein said woven cloth includes polytetrafluoroethylene fibers mechanically secured to said barrier layer in position to form the low friction surface of said element.

References Cited in the file of this patent

UNITED STATES PATENTS

| | | |
|---|---|---|
| 2,219,054 | Palm | Oct. 22, 1940 |
| 2,322,771 | Palm et al. | June 29, 1943 |
| 2,450,948 | Foster | Oct. 12, 1948 |
| 2,503,028 | Cook | Apr. 4, 1950 |
| 2,542,297 | Sunbury | Feb. 20, 1951 |
| 2,551,175 | Smith | May 1, 1951 |
| 2,681,223 | Walters | June 15, 1954 |
| 2,700,997 | Morrissey | Feb. 1, 1955 |
| 2,705,691 | Panagrossi et al. | Apr. 5, 1955 |
| 2,715,617 | White | Aug. 16, 1955 |
| 2,723,932 | Ross et al. | Nov. 15, 1955 |
| 2,736,680 | Kidwell | Feb. 28, 1956 |
| 2,768,925 | Fay | Oct. 30, 1956 |
| 2,774,704 | Smith | Dec. 18, 1956 |
| 2,777,783 | Welch | Jan. 15, 1957 |
| 2,804,886 | White | Sept. 3, 1957 |

FOREIGN PATENTS

| | | |
|---|---|---|
| 711,620 | Great Britain | July 7, 1954 |
| 730,655 | Great Britain | May 25, 1955 |